United States Patent

[11] 3,548,904

[72] Inventor Bernard B. Mackell
   West Islip, N.Y.
[21] Appl. No. 811,534
[22] Filed Mar. 28, 1969
[45] Patented Dec. 22, 1970
[73] Assignee Davis Aircraft Products Company, Inc.
   Northport, N.Y.
   a corporation of New York

[54] INFLATABLE CARGO BLANKET
   11 Claims, 13 Drawing Figs.
[52] U.S. Cl. .................................................. 150/.5,
   52/2, 52/3; 53/29
[51] Int. Cl. .................................................. E04b 1/345
[50] Field of Search .......................................... 214/10.5I;
   150/.5; 52/2, 3, 4; 248/361A, 361; 244/118, 137;
   206/Inflatable; 53/29

[56] References Cited
   UNITED STATES PATENTS
| 2,455,237 | 11/1948 | Davis | 248/361(A) |
| 2,605,064 | 7/1952 | Davis | 248/361(A)X |
| 2,656,844 | 10/1953 | Kreuzer | 52/2 |
| 2,900,994 | 8/1959 | Igoe | 52/2 |
| 2,907,580 | 10/1959 | Tietig | 214/10.5(I)UX |
| 3,332,177 | 7/1967 | Sepp | 52/2 |
| 3,457,684 | 7/1969 | Wood | 52/2 |

Primary Examiner—Donald F. Norton
Attorney—Arthur T. Groeninger

ABSTRACT: A cargo blanket for covering and securing cargo to a support, said blanket including fluid impervious compartment members capable of being inflated to form the blanket into a structure having a shape defining the outline of the interior of an aircraft, or other cargo container, whereby, the blanket, in addition to its covering and securing functions, is capable of defining the bounds within which the support can be loaded.

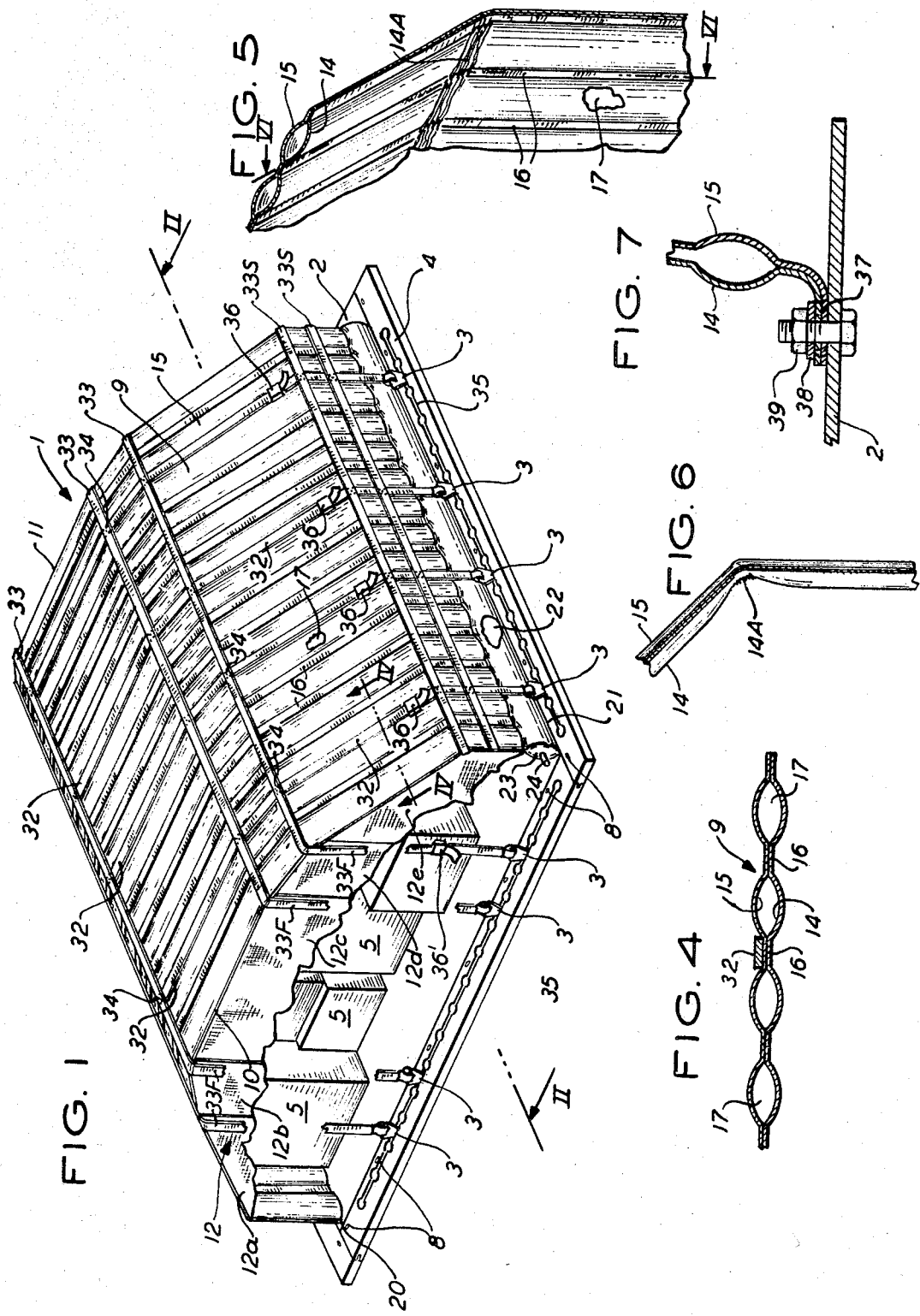

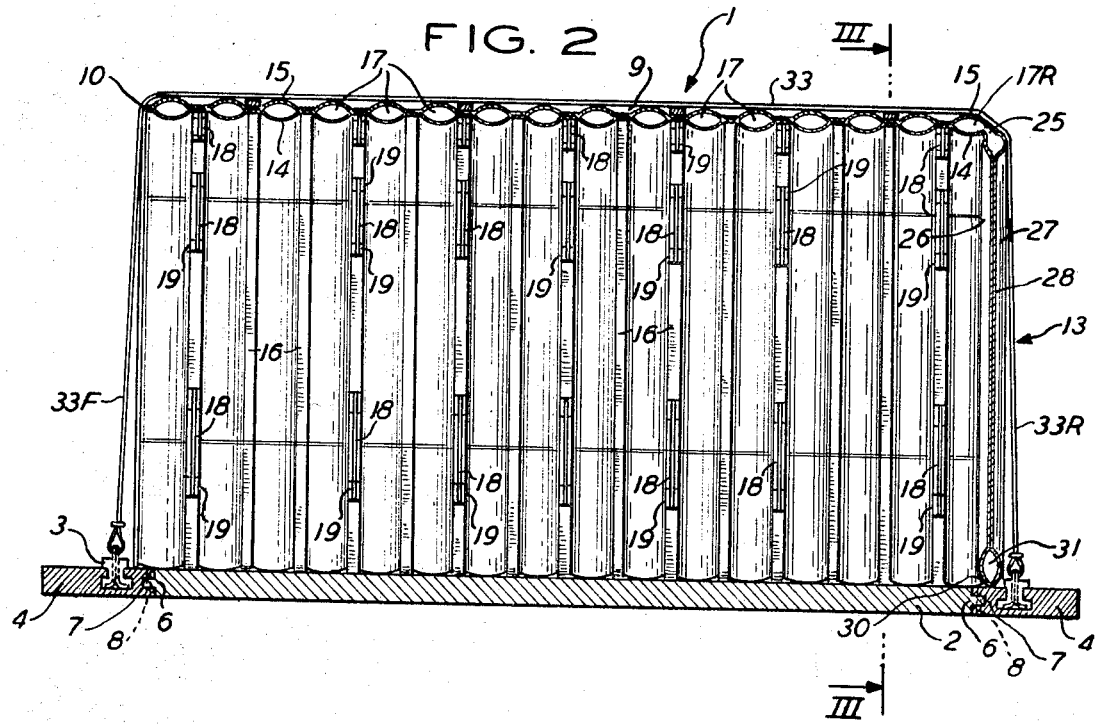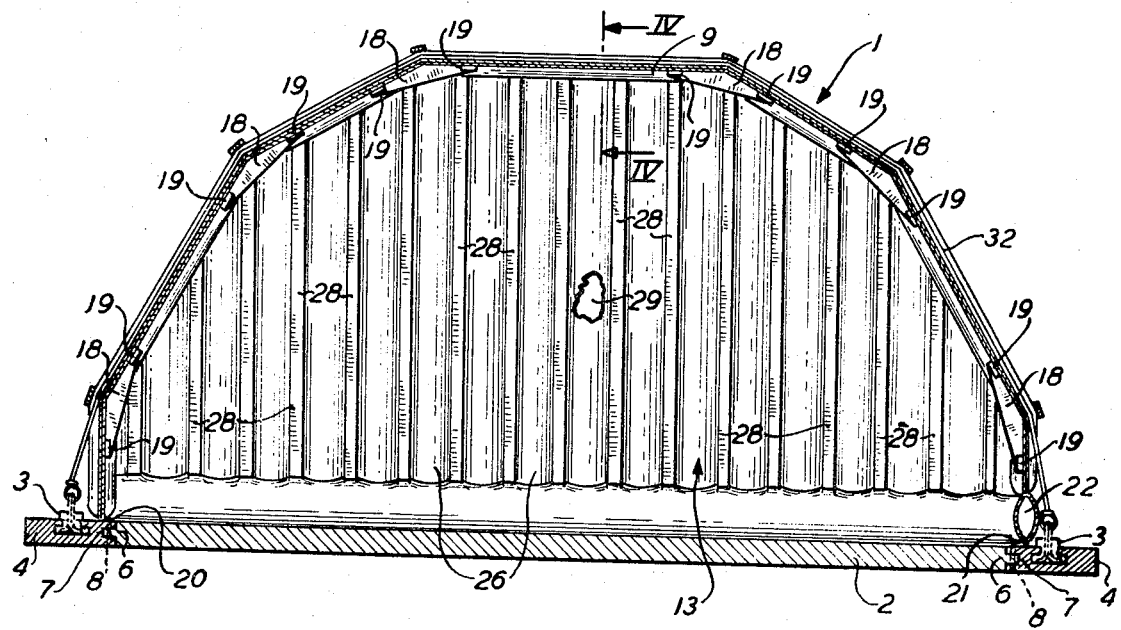

PATENTED DEC 22 1970

INVENTOR
BERNARD B. MACKELL

BY
Arthur T. Groemer
ATTORNEY

INFLATABLE CARGO BLANKET

BACKGROUND OF THE INVENTION

Airfreight costs are largely controlled by equipment use time, i.e., flying time per unit of elapsed time. In order to reduce nonuse time incident to freight loading and unloading operations, freight is preloaded on supports ready to be quickly loaded onto, and unloaded from, the freight aircraft.

Heretofore, rigid structures defining the outline of the interior of an aircraft have been secured to the cargo supports so as to insure that cargo preloaded on the support will be capable of fitting within the aircraft. While these outline defining structures are essential to the preloading operation, many problems are presented.

In order to prevent shifts in load, regulations require fillers to be added to fill empty spaces remaining in the outline structure after the cargo has been loaded. This increases handling and weight and in turn, the cost. Since the outline structure is rigid, it is not possible to collapse the same so as to minimize the space occupied when they are transported to freight terminals in need of the same. As a result, extra aircraft is sometimes required merely to transport these rigid outline structures.

BRIEF SUMMARY OF THE INVENTION

The invention comprises a cargo blanket adapted to protectively cover and secure cargo to a support. The blanket is capable of being inflated to form a structure having a shape defining the outline of the interior of an aircraft or other cargo container. Cargo is loaded on the support while the blanket is inflated with care exercised to assure that no cargo extends beyond the periphery defined by the blanket structure.

After loading the cargo onto the support, the blanket is deflated so that it wraps about the cargo. If desired, the blanket may be left partially inflated so as to provide a cushion against objects impinging thereagainst.

The blanket includes webbing together with web-tensioning devices to make the blanket snug about the cargo thereby preventing cargo shift without a need for fillers.

Prior to unloading, the web-tensioning devices are relaxed and the blanket is removed from the support or again inflated so as to provide access to the cargo.

When the support is unloaded, the blanket collapses flat on the support. Several cargo support and cargo blanket combinations may be returned to their point of origin in a single airplane in case there is no return load.

The present invention has application to cargo restraint in vehicles other than aircraft and may be utilized in connection with rail cars, trucks, ships and any type containers used for the transportation and shipment of goods. In order to accommodate different type vehicles, provision is made for adjusting the size and shape of the blanket of the present invention.

THE DRAWINGS

FIG. 1 is a perspective view of a cargo blanket made in accordance with the present invention showing the blanket, in its inflated condition, removably secured to a cargo support.

FIG. 2 is a sectional view taken on line II–II of FIG. 1 with the cargo removed.

FIG. 3 is a sectional view taken on line III–III of FIG. 2 with the cargo removed.

FIG. 4 is a fragmentary sectional view taken on line IV–IV of FIG. 1.

FIG. 5 is a fragmentary perspective view of a modified form of the present invention.

FIG. 6 is a cross section taken along line VI–VI of FIG. 5.

FIG. 7 is a fragmentary sectional view of a modified connection between the cargo blanket and the support.

DETAILED DESCRIPTION

Figure 8:
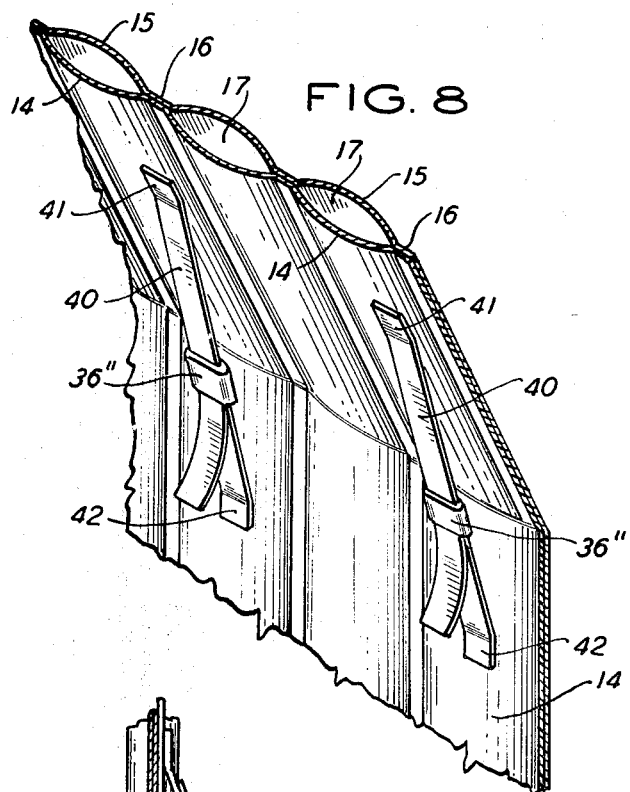
FIG. 8 is a fragmentary perspective view of a modified form of the present invention including web adjustment means for modifying the shape of the inflated blanket.

Like reference numerals apply to similar parts through the several views.

Referring to FIGS. 1, 2, and 3, the cargo blanket 1 of the present invention is secured to cargo support 2. Blanket 1 is made from a fluid impervious material such as plastic, resin impregnated fabric etc.

In FIG. 1, blanket 1 is shown in its inflated condition forming a structure defining the outline of the interior of a particular aircraft. The blanket 1 includes anchor fittings 3 which are adapted to be releasably secured to tie down track 4 extending about the periphery of cargo support 2.

Support 2 is conventional comprising, for example, a flat supporting member on which may be placed a plurality of containers 5 which form the cargo to be carried. Typically, the support is constructed of heavy duty plywood or other equivalent construction.

Tiedown track 4 may be made integral with support 2 or as shown, may be separate members removably secured to support 3 along its four edges thereby permitting replacement in case of damage. A peripheral tongue portion 6 on support 2 (see FIGS. 2 and 3) is of reduced thickness and is adapted to be frictionally received in a U-shaped groove 7 of tiedown track 4. A plurality of bolts 8 extend through the track 4 and peripheral tongue portion 6 to secure the track 4 to support 2.

Blanket 1 includes a wall 9 which when inflated forms the top and sides of the inflated blanket 1. The tops and sides of blanket 1 include forward edge 10 and rear edge 11 from which depend front cover 12 and inflatable rear end wall 13 respectively.

Front cover 12 is comprised of a plurality of individual flexible single thickness cover sheets 12A, 12B, 12C, 12D and 12E which are secured along their upper edges to the forward edge 10. These sheets are free along their side and lower edges permitting them to be flipped back on the top wall so as to provide access to the interior on the inflated blanket 1.

As best shown in FIGS. 2 and 4, wall 9 is of a double thickness comprising inner layer 14 and outer layer 15. As shown more particularly in FIGS. 1 and 4, layers 14 and 15 are joined together along paths 16 extending about the sides and top of the blanket 1 to divide the space between the layers into a series of elongated air compartments 17 which extend about the sides and top of the inflated blanket 1. Layers 14 and 15 may be secured together with adhesive along paths 16.

Gussets 18 (see FIG. 3) are provided on inner layer 14 so as to impart a desired shape to the inflated blanket 1. Gussets 18 comprise angle sheets having flanges 19 (see FIG. 2) secured by adhesive along path 16 to the surface of inner layer 14. Gussets 18 may be made from plastic, metal or other material sufficiently rigid to impart a desired shape. While not controlling the shapes as well as rigid material, gussets 18 may be made of flexible material.

Referring to FIGS. 5 and 6, a modified version of the present invention is shown wherein gussets 18 are eliminated. In this embodiment, inner layer 14 is heat shrunk, as indicated 14A, so as to shorten inner layer 14 relative to outer layer 15 and thereby causes a bending of wall 9. Sections 14A are shrunk to a degree so that wall 9 takes on the desired shape. Bending is accomplished by applying heat by means of electrically heated rod, or other controllable heating device, to inner layer 14 while compartments 17 are inflated. In this embodiment, inner layer 14, at least in area 14A, is made of, or laminated or coated with, a conventional heat shrinkable film material such as, e.g., biaxially stretched polyethylene or polystyrene.

It will be noted (see FIGS. 1 and 3) that paths 16, along which the inner and outer layers 14 and 15 are joined, extend to edge 20 of wall 9 but terminate in space relation to edge 21 thereby forming an air passage 22 (see FIG. 3) which is interconnected with all of the compartments 17.

Air passage 22 is closed by end wall 23. Wall 23 has an air valve 24, of the type used on automobile tires, extending therethrough. All compartments 17 will be inflated when air under pressure is admitted through air valve 24 into passage 22.

The forward edge 10 and side edges 20 and 21 of wall 9 are formed (see FIGS. 2 and 3) by adhesively joining together inner and outer layers 14 and 15 so as to provide an air seal. The rear edge 10 is also formed by securing together inner and outer layers 14 and 15 except that they are left unconnected for a short distance to form a passage 25 (see FIG. 2) communicating with rear end wall 13.

Rear end wall 13 is provided with pliable inner and outer layers 26 and 27 respectively (see FIG. 2) united together along paths 28 (see FIG. 3) to form a plurality of vertically extending air compartments 29 therebetween.

Layers 26 and 27 are adhesively joined together at their lower end 30 (see FIG. 2) of end wall 13 so as to provide an air seal. At their upper ends, layers 26 and 27 are adhesively joined, respectively, to inner and outer layers 14 and 15 of wall 9 and define, together with the unconnected portions of layers 14 and 15, passage 25, as hereinbefore described.

Paths 28 terminate in space relation to lower end 30 of rear wall 13 thereby forming air passage 31 which interconnects all of the compartments 29. Passage 25 interconnects the rearmost compartments 17R of wall 9 with one of the compartments 29 of rear end wall 13. Thus, inflation of wall 9 will result in inflation of rear end wall 13. Hence, both wall 9 and 13 may be filled from air valve 24.

While the cargo is being loaded, front cover sheets 12A, 12B, 12C 12D and 12E are flipped back on top of wall 9. After loading, the front covers are flipped down covering the front entrance. Air valve 24 is then adjusted so as to let air out of the inflated blanket 1 thereby collapsing it about the cargo 5.

Once collapsed, the blanket 1 is cinched by webbing 32 and 33 secured thereto, so as to secure the cargo 5 to support 2. Webbing 32 extends from side to side of blanket 1 while webbing 33 extends from the front to the rear of the blanket 1.

Referring to FIGS. 1 and 4, webbing 32 is secured by adhesively securing the same along selected paths 16 which, as shown, are of a width sufficient to accommodate the width of the webbing 32. Webbing 33, which extends across webbing 32, may be secured thereto by sewing 34 (see FIG. 1) or any other conventional method.

Webbings 32 an 33 are secured at their respective extremities to support 2 by anchor fittings 3 releasably secured to a tiedown track 4. Track 4 has inverted T-shaped channel 35 for receiving anchor fittings 3. This fitting and track arrangement is of the type shown and described in U.S. Pat. No. 3,442,508 issued Jan. 21, 1969 to N. Higuichi and assigned to the same assignee as the present invention.

In order to cinch the webbing 32 so as to secure cargo 5 on support 2, web-tensioning buckles 36 are provided. This allows for adjustment and tensioning of a web 32. Details of the web-tensioning means are not shown as such are conventional and may be of the type shown and described in U.S. Pat. No. 3,423,800 or U.S. Pat. No. 3,252,188, both of which issued to F.L. Davis and are assigned to the same assignee as the present invention. Webbing 32 is left unsecured to the blanket 1 in the area adjacent buckle 36 so as to allow cinching and tensioning. It is to be understood that a greater or lesser area may be left unsecured so as to allow cinching to any desired degree.

Webbing 33S extending along the side of blanket 1, terminates at the forward and rear edges 10 and 11 of wall 9. Webbing 33 extending along the top wall of blanket 1 is adapted to extend beyond the forward and rear edges 10 and 11 of the wall 9 as shown at 33F and 33R (see FIGS. 1 and 2).

After cargo 5 is loaded, front covers 12 and webbing 33F are flipped down across the front entrance. Webbing 33F is then releasably secured by anchor fittings 3 to tiedown track 4 on support 2. Intermediate the webbing 33F, a web tensioning buckle 36' is provided. This buckle is identical to buckle 36 hereinbefore described so as to allow for adjustment and tensioning of webbing 33F to thereby tie down cargo 5 and prevent movement forwardly and rearwardly of support 2.

It is not essential that the webbing 32 and 33 be secured to blanket 1. Referring to FIG. 7, a modification of the present invention is shown wherein means other than the webbing is used to secure blanket 1 to support 2. As shown, inner and outer layers 14 and 15 have extensions which are secured together at 37. The secured together section 37 is secured to support 2 by a sealing plate 38 under clamping pressure from bolt 39 which extends through apertures formed in section 37, plate 38 and support 2.

By securing the blanket 1 by the method illustrated in FIG. 6, the present invention may be readily adapted to most cargo supports presently in use. The blanket 1 can be secured anywhere within the boundaries of the tiedown track on such supports. The tiedown webbing or other tiedown gear presently used on such supports may be used to cinch blanket 1 about the cargo.

Figure 9:
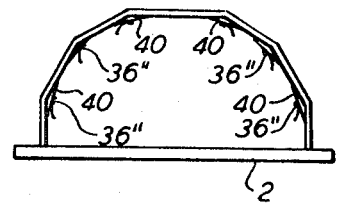
FIG. 9 is a schematic diagram illustrating an adjustment in shape when the web adjustment means of FIG. 8 is tensioned.
Figure 10:
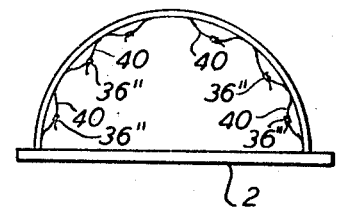
FIG. 10 is a schematic diagram illustrating the shape when the web adjustment means of FIG. 9 is relaxed.

Referring to FIGS. 8, 9, and 10, a modified gusset arrangement is shown for adjusting the shape of the inflated blanket 1. In this embodiment, a pliable wall connecting web 40 is shown adhesively secured at its ends 41 and 42 to inner wall 14. Intermediate the wall connecting web 40, a buckle 36" is provided for adjusting and tensioning web 40. Buckle 36" is identical to buckle 36, hereinbefore described. The blanket 1 may be made to take on a shape (see FIG. 9) when the wall connecting web 40 is tensioned which is different from the shape (see FIG. 10) taken on when web 40 is relaxed by loosening buckle 36".

Any number of wall connecting webs may be employed so as to provide for any desired number of adjustments in shape. This capability allows the blanket to be used for different-shaped aircraft and containers. In this embodiment of the invention, inflated rear end wall 13 is replaced by covers of the type 12 used to cover the front entrance so as to minimize interference between adjustments.

Figure 11:
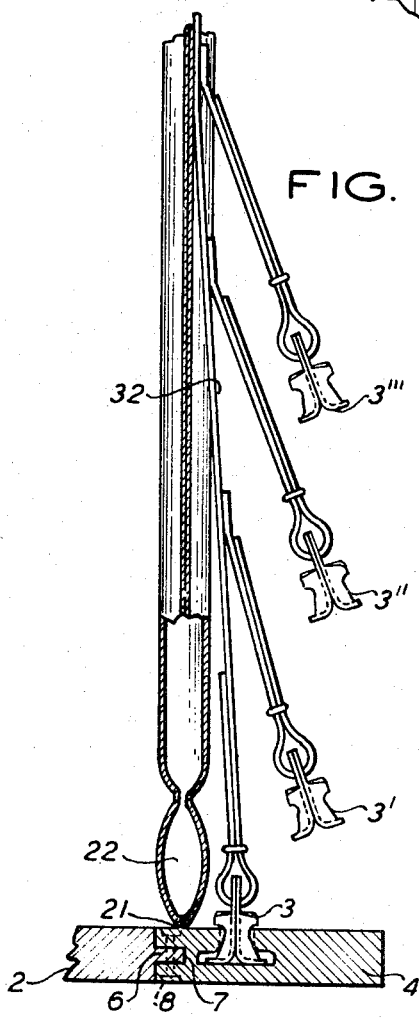
FIG. 11 is a sectional view of a further modification of the present invention including a plurality of anchoring devices for adjusting the size of the inflated blanket.
Figure 12:
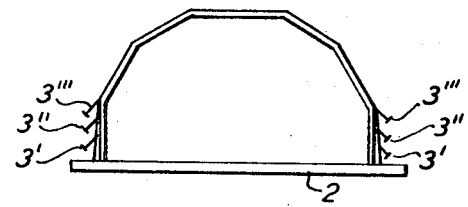
FIG. 12 is a schematic diagram illustrating the size of the blanket in its normal position.
Figure 13:
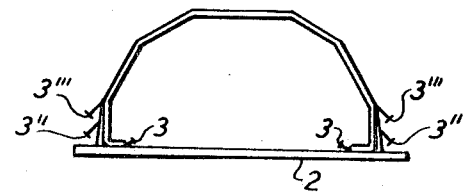
FIG. 13 is a schematic diagram illustrating the size of the blanket when another of the anchoring devices is employed.

Referring to FIG. 11, a further modification of the present invention is shown wherein the size of the blanket 1 may be adjusted by providing anchor fittings 3', 3" and 3''' at intermediate portions of webbing 32 so as to permit the blanket 1 to be adjusted in size as shown schematically in FIGS. 12 and 13. Again in this embodiment, end wall 13 is preferably replaced by covers similar to front covers 12 so as to minimize interference between adjustment. Rather than using the anchor fittings, webs extending from paths 16 may be used with apertures adjacent their free end for bolting to support 2.

While specific embodiments of the present invention have been described, it is to be understood that it is desired to protect all changes and modifications to these embodiments as well as new uses which fall within the scope of the invention. For example, while size adjustment and shape adjustment means have been illustrated as applied to cargo tiedown gear, it is to be understood that such a structure would have equal application to various type enclosures of the inflatable type completely unrelated to tiedown gear.

I claim:

1. The combination comprising covering means, securing means for securing said covering means to a support, cinching means for cinching said covering means about articles on a support, and fluid impervious means for forming said covering means into a structure of predetermined shape.

2. The combination as defined by claim 1 wherein said securing means includes means for releasably securing said covering means to a support.

3. The combination as defined by claim 1, said cinching means comprising webbing secured to said covering means and means for tensioning said webbing.

4. The combination as defined by claim 1, wherein said covering means is formed of pliable sheet material of double thickness, said fluid impervious means comprising a plurality of air pockets formed by said double thickness sheet material.

5. The combination as defined by claim 1, including means for adjusting the shape of said covering means.

6. The combination as defined by claim 1, including means for adjusting the size of said covering means.

7. The combination comprising a support adapted to support articles, blanket means, means for releasably securing said blanket means to said support means for securing articles on said support, and air compartments for forming said blanket means into a structure of predetermined shape.

8. An article support comprising support means for supporting articles, fluid impervious means for forming an inflated structure on said support means, said inflated structure defining the bounds within which said support may be loaded so that the articles loaded on said support is capable of fitting within the interior of an article carrier, said support means including means cooperating with restraining means for restraining movement of articles on said support.

9. The article support as defined by claim 8, said restraining means comprising webbing; means for tensioning said webbing so that said webbing is cinched about articles on said support.

10. A method of loading articles comprising:
 a. providing a support means;
 b. providing an inflatable means on said support means;
 c. inflating said inflatable means to a predetermined configuration corresponding to the configuration of a portion of an article carrier;
 d. loading articles on said support means within said inflated inflatable means; and
 e. securing said articles to said support means.

11. A method as defined by claim 10, deflating said inflated inflatable means prior to securing said articles to said support.